United States Patent
Suzuki

(10) Patent No.: US 12,031,198 B2
(45) Date of Patent: Jul. 9, 2024

(54) ALUMINUM ALLOY FOIL

(71) Applicant: MA Aluminum Corporation, Minato-ku (JP)

(72) Inventor: Takashi Suzuki, Susono (JP)

(73) Assignee: MA Aluminum Corporation, Minato-ku (JP)

(*) Notice: Subject to any disclaimer, the term of this patent is extended or adjusted under 35 U.S.C. 154(b) by 0 days.

(21) Appl. No.: 18/258,789

(22) PCT Filed: Dec. 21, 2021

(86) PCT No.: PCT/JP2021/047245
§ 371 (c)(1),
(2) Date: Jun. 21, 2023

(87) PCT Pub. No.: WO2022/138620
PCT Pub. Date: Jun. 30, 2022

(65) Prior Publication Data
US 2024/0043968 A1    Feb. 8, 2024

(30) Foreign Application Priority Data

Dec. 25, 2020  (JP) ................. 2020-216370
Oct. 26, 2021  (JP) ................. 2021-174502

(51) Int. Cl.
*C22C 21/00*  (2006.01)
*C22F 1/04*  (2006.01)

(52) U.S. Cl.
CPC ............ *C22C 21/00* (2013.01); *C22F 1/04* (2013.01)

(58) Field of Classification Search
CPC .................. C22C 21/00; C22F 1/04
See application file for complete search history.

(56) References Cited

U.S. PATENT DOCUMENTS

| | | |
|---|---|---|
| 2015/0203941 A1 | 7/2015 | Seki et al. |
| 2020/0123639 A1 | 4/2020 | Suzuki |
| 2020/0216933 A1 | 7/2020 | Suzuki |

FOREIGN PATENT DOCUMENTS

| | | |
|---|---|---|
| JP | 2004-27353 A | 1/2004 |
| JP | 2007-308805 A | 11/2007 |
| JP | 2019-14939 A | 1/2019 |
| JP | 2019-14940 A | 1/2019 |
| WO | WO 2012/036181 A1 | 3/2012 |
| WO | WO 2013/168606 A1 | 11/2013 |
| WO | WO 2014/021170 A1 | 2/2014 |
| WO | WO 2014/034240 A1 | 3/2014 |
| WO | WO 2019/008783 A1 | 1/2019 |
| WO | WO 2019/008784 A1 | 1/2019 |
| WO | WO 2019/124530 A1 | 6/2019 |
| WO | WO 2020/137394 A1 | 7/2020 |
| WO | WO 2022/224615 A1 | 10/2022 |

OTHER PUBLICATIONS

International Search Report and Written Opinion issued Mar. 22, 2022, in PCT/JP2021/047245 (with English Translation), 10 pages.
Office Action issued Mar. 28, 2023, in corresponding Japanese Patent Application No. 2021-174502 (with English Translation), 5 pages.
Third Party Observation issued Apr. 26, 2023, in PCT/JP2021/047245, 4 pages.
Notification issued May 9, 2023, in corresponding Japanese Patent Application No. 2021-174502 (with English Translation), 12 pages.
Extended European Search Report issued Jan. 17, 2024 in European Patent Application No. 21910763.8, 7 pages.

*Primary Examiner* — Jessee R Roe
(74) *Attorney, Agent, or Firm* — Oblon, McClelland, Maier & Neustadt, L.L.P.

(57) ABSTRACT

An aluminum alloy foil having a composition including, Fe of 1.0% by mass or more and 1.8% by mass or less, Si of 0.01% by mass or more and 0.08% by mass or less, Cu of 0.005% by mass or more and 0.05% by mass or less, Mn of 0.01% by mass or less, and Al. In a crystal orientation analysis per unit area by electron backscatter diffraction (EBSD), a ratio (HAGBs/LAGBs) of a length of high angle grain boundaries (HAGBs) having an orientation difference of 15° or more to a length of low angle grain boundaries (LAGBs) having an orientation difference of 2° or more and less than 15° is more than 2.0, and a Cu orientation density is 40 or less and an R orientation density is 30 or less as a texture.

5 Claims, 1 Drawing Sheet

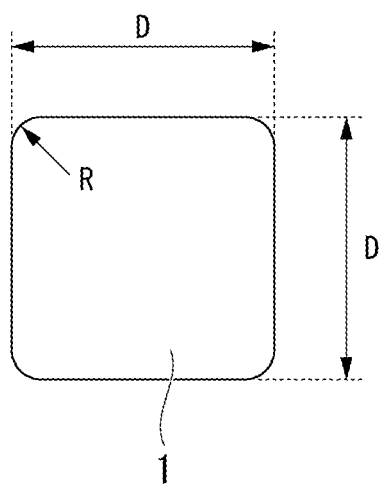

ALUMINUM ALLOY FOIL

CROSS REFERENCE TO RELATED APPLICATIONS

This application is a National Stage entry under 35 U.S.C. § 371 of PCT/JP2021/047245, filed on Dec. 21, 2021, and claims priority to Japanese Patent Application No. 2020-216370, filed on Dec. 25, 2020 and Japanese Patent Application No. 2021-174502, filed on Oct. 26, 2021. The entire contents of each are incorporated herein by reference.

TECHNICAL FIELD

Background Art

Aluminum foils, which are used as packaging materials for food or batteries such as lithium-ion secondary batteries, are significantly distorted by press forming or the like. Therefore, aluminum foils for packaging materials have been conventionally required to have favorable formability, and soft foils of 1000 series alloys such as 1N30 or 8000 series alloys such as 8079 and 8021 are in use.

In the forming of aluminum alloy foils, an elongation is an important parameter, but aluminum alloy foils are not always distorted in one direction, and so-called stretch forming is often performed. Therefore, a high elongation is required not only in a direction parallel to a rolling direction, which is generally used as the elongation value of the material in aluminum alloy foils, but also in a direction at each of 45° or 90°.

In addition, recently, thinning of packaging material thickness has been underway in the applications of aluminum alloy foils, including the battery packaging material field.

CITATION LIST

Patent Documents

[Patent Document 1]
  PCT International Publication No. WO2014/021170 (A)
[Patent Document 2]
  PCT International Publication No. WO2014/034240 (A)
[Patent Document 3]
  Japanese Unexamined Patent Application, First Publication No. 2004-27353 (A)

SUMMARY OF INVENTION

Technical Problem

However, in an aluminum alloy foil described in Patent Document 1, there is a concern that the amount of Cu added is as large as a maximum of 0.5% by mass. Since Cu is an element that degrades the rollability of aluminum alloy foils even in a small amount, there is a risk that edge cracking may occur during rolling and the foils may break. In addition, in the aluminum alloy foil described in Patent Document 1, there is a possibility that the average crystal grain size may become large, which makes it difficult to maintain high formability when the thickness of the foil has been reduced.

In an aluminum alloy foil described in Patent Document 2, an extremely fine crystal grain size is specified, but crystal grain boundaries are limited to those having an orientation difference of 5° or more. The orientation difference of a crystal grain boundary being 5° or more means that high angle grain boundaries and low angle grain boundaries are present in a mixed manner and whether a crystal grain surrounded by high angle grain boundaries is fine or not is not clear.

Unlike Patent Documents 1 and 2, the description of Patent Document 3 relates not to a battery exterior foil but to a thin foil having a thickness of 10 μm or less, and the thin foil is manufactured without process annealing, and thus the texture develops. Therefore, a stable elongation cannot be obtained in directions at 0°, 45°, and 90° with respect to a rolling direction. In addition, the average crystal grain size is 10 μm or more, and, in a case where the thickness of the foil is thin, obtainment of high formability cannot be expected.

The present invention has been made with a background of the above-described problems, and one objective of the present invention is to provide an aluminum alloy foil having favorable workability and a high elongation characteristic.

Solution to Problem (1) An aluminum alloy foil of the present embodiment has a composition comprising: Fe of 1.0% by mass or more and 1.8% by mass or less; Si of 0.01% by mass or more and 0.08% by mass or less; Cu of 0.005% by mass or more and 0.05% by mass or less; Mn of 0.01% by mass or less; and a remainder including Al and inevitable impurities, in which, in a crystal orientation analysis per unit area by electron backscatter diffraction (EBSD), a ratio (HAGBs/LAGBs) of a length of high angle grain boundaries (HAGBs) having an orientation difference of 15° or more to a length of low angle grain boundaries (LAGBs) having an orientation difference of 2° or more and less than 15° is more than 2.0, a Cu orientation density is 40 or less and an R orientation density is 30 or less, and a difference ($Ra_{20} - Ra_0$) between an initial surface roughness $Ra_0$ and a surface roughness $Ra_{20}$ when a strain of the aluminum alloy foil is 20% in a tensile test is 0.25 μm or less.

(2) In the aluminum alloy foil of the present embodiment, it is preferable that an elongation in a direction at each of 0°, 45°, or 90° with respect to a rolling direction is 28% or more.

(3) In the aluminum alloy foil of the present embodiment, it is preferable that an average grain size of crystal grains surrounded by high angle grain boundaries having an orientation difference of 15° or more is 6 μm or more and 15 μm or less and maximum grain size/average grain size≤3.5 is satisfied.

Advantageous Effects of Invention

According to the aluminum alloy foil according to the present invention, it is possible to obtain an aluminum alloy foil having a high elongation characteristic.

BRIEF DESCRIPTION OF DRAWINGS

FIG. 1 is a view showing a flat surface shape of a square punch that is used in a limit forming height test in an example of the present invention.

DESCRIPTION OF EMBODIMENTS

Hereinafter, an example of an embodiment of the present invention will be described in detail based on the accompanying drawing. In the drawing to be used in the following description, there are cases where a characteristic portion is shown in an enlarged manner for convenience in order to facilitate the understanding of the characteristics.

Hereinafter, contents specified by an aluminum alloy foil according to the present embodiment will be described.

The aluminum alloy foil according to the present embodiment has a composition which contains Fe of 1.0% by mass or more and 1.8% by mass or less, Si of 0.01% by mass or more and 0.08% by mass or less, and Cu of 0.005% by mass or more and 0.05% by mass or less and in which Mn is regulated to 0.01% by mass or less and the remainder includes Al and inevitable impurities.

In the aluminum alloy foil according to the present embodiment, it is preferable that, in a crystal orientation analysis per unit area by electron backscatter diffraction (EBSD), the ratio (HAGBs/LAGBs) of the length of high angle grain boundaries (HAGBs) having an orientation difference of 15° or more to the length of low angle grain boundaries (LAGBs) having an orientation difference of 2° or more and less than 15° is more than 2.0, as a texture, the Cu orientation density is 40 or less, the R orientation density is 30 or less, and the difference ($Ra_{20}-Ra_0$) between an initial surface roughness $Ra_0$ and a surface roughness $Ra_{20}$ when strain is 20% in a tensile test is 0.25 μm or less.

In addition, in the aluminum alloy foil of the present embodiment, it is preferable that an elongation in a direction at each of 0°, 45°, or 90° with respect to a rolling direction is 28% or more.

Furthermore, in the aluminum alloy foil of the present embodiment, it is preferable that the average grain size of crystal grains surrounded by the high angle grain boundaries having an orientation difference of 15° or more is 6 μm or more and 15 μm or less and maximum grain size/average grain size≤3.5 is satisfied.

Hereinafter, each element that is contained in an aluminum alloy that configures the aluminum alloy foil according to the present embodiment will be described.

Fe: 1.0% by Mass or More and 1.8% by Mass or Less

Fe crystallizes as an Al—Fe-based intermetallic compound during casting and, in a case where the size of the compound is large, becomes a recrystallization site during annealing to have an effect of refining recrystallized grains. When the Fe content is below the lower limit (1.0% by mass), the distribution density of a coarse intermetallic compound becomes low, the refining effect becomes low, and the final crystal grain size distribution also becomes nonuniform. When the Fe content exceeds the upper limit (1.8% by mass), the crystal grain refinement effect is saturated or, conversely, reduced, furthermore, the size of the Al—Fe-based compound that is formed during casting becomes extremely large, and the elongation and rollability of the foil deteriorate.

Therefore, the Fe content is decided in the above-described range. For the same reason, the Fe content is more preferably set to 1.0% by mass or more and 1.6% by mass or less.

Si: 0.01% by Mass or More and 0.10% by Mass or Less

Si forms an intermetallic compound with Fe; however, in a case where the amount of Si added is large, the size of the compound becomes coarse, and the distribution density decreases. When the Si content exceeds the upper limit (0.10% by mass), there is a concern that a coarse crystallized substance may degrade the rollability and the elongation characteristic and, furthermore, the uniformity of the recrystallized grain size distribution after final annealing may deteriorate.

For these reasons, the Si content is preferably as low as possible; however, when the Si content becomes less than the lower limit (0.01% by mass), it is necessary to use a high-purity scull, which significantly increases the manufacturing cost.

In addition, in a case where a high-purity scull has been used, since even a trace component such as Cu becomes extremely low, excessive work softening occurs during cold rolling, and there is a concern that the rollability may deteriorate. For the above-described reasons, the Si content is determined in a range of 0.01% by mass or more and 0.10% by mass or less.

For the same reason, the Si content is preferably set to 0.01% by mass or more and 0.05% by mass or less.

Cu: 0.005% by Mass or More and 0.05% by Mass or Less

Cu is an element that increases the strength of the aluminum foil and degrades the elongation. On the other hand, Cu has an effect of suppressing excessive work softening during cold rolling. In a case where the Cu content is less than 0.005% by mass, the effect of suppressing work softening is low, and, when the Cu content exceeds 0.05% by mass, the elongation clearly deteriorates. Therefore, the Cu content is set in the above-described range.

For the same reason, the Cu content is more preferably set in a range of 0.005% by mass or more and 0.01% by mass or less.

Mn: 0.01% by Mass or Less

Mn forms a solid solution in the aluminum matrix phase or forms an extremely fine compound and has an action of suppressing the recrystallization of aluminum. When the Mn content is an extremely small amount, similar to Cu, suppression of work softening can be expected; however, when the amount added is large, process annealing and recrystallization during final annealing are delayed, and it becomes difficult to obtain fine and uniform crystal grains. Therefore, the Mn content is regulated to 0.01% by mass or less.

For the same reason, the Mn content is more preferably set to 0.005% by mass or less.

"HAGBS/LAGBS>2.0"

Although not limited to Al—Fe alloys, depending on recrystallization behaviors during annealing, the ratio (HAGBs/LAGBs) of the length L1 of high angle grain boundaries (HAGBs) and the length L2 of low angle grain boundaries (LAGBs) occupying the total crystal grain boundaries changes.

In a case where the fraction of LAGBs is large after final annealing, even when the average crystal grain is fine, in the case of L1/L2≤2.0, local distortion is likely to occur, and the elongation deteriorates. Therefore, it is desirable to make L1/L2>2.0, and a higher elongation can be expected by satisfying this specification. The ratio (HAGBs/LAGBs) is more preferably set to 2.5 or more.

The lengths of the high angle grain boundaries and the low angle grain boundaries can be measured, similar to the crystal grain sizes, by SEM-EBSD. L1/L2 can be calculated from the total length of the high angle grain boundaries and the low angle grain boundaries in the area of the observed visual field.

"As Texture, Cu Orientation Density being 40 or Less and R Orientation Density being 30 or Less"

The texture has a significant influence on the elongation of the foil. When the Cu orientation density exceeds 40 and the R orientation density also exceeds 30, anisotropy is caused in the elongation values at 0°, 45°, and 90°, and, in particular, the elongation values in the 0° and 90° directions decrease. When anisotropy is caused in the elongation, uniform distortion is not possible during forming, and the formability deteriorates. More preferably, the Cu orientation density is 30 or less, and the R orientation density is 20 or less.

"Difference ($Ra_{20}$–$Ra_0$) Between Initial Surface Roughness $Ra_0$ and Surface Roughness $Ra_{20}$ when Strain is 20% in Tensile Test being 0.25 μm or Less"

The present inventors know that, during forming, the surface of an aluminum foil roughens as the forming progresses, and it is presumed that, in a case where this surface roughening during forming is small, favorable formability can be obtained. As factors that affect the surface roughening of the aluminum foil during distortion, crystal grain sizes, texture, and the distribution state of an intermetallic compound are exemplary examples, these are complicate factors that act on one another, and the whole picture thereof is not yet clarified. The present inventors found that, in a case where the initial surface roughness of the aluminum foil is represented by $Ra_0$, and the surface roughness of the aluminum alloy foil when strain is 20% in tensile distortion is represented by $Ra_{20}$, when an increase in the surface roughness ($Ra_{20}$–$Ra_0$) is suppressed at 0.25 μm or less, consequently, it is possible to obtain a foil having favorable formability.

From this viewpoint, that the increase in the surface roughness of the aluminum foil during forming is more preferably 0.20 μm or less.

"For Crystal Grains Surrounded by High Angle Grain Boundaries Having Orientation Difference of 15° or More, Average Grain Size being 6 μm or More and 15 μm or Less and Maximum Grain Size/Average Grain Size≤3.5"

When crystal grains in a soft aluminum foil become fine, it is possible to suppress the roughening of the foil surface when distorted, and a high elongation and subsequent high formability can be expected. As one of the factors that affect this surface roughening, the crystal grain size is an exemplary example, and, in order to realize a high elongation characteristic or subsequent high formability, for crystal grains surrounded by the high angle grain boundaries having orientation difference of 15° or more, the average crystal grain size is desirably 15 μm or less. In addition, when the average grain size is less than 6 μm, the formability deteriorates in association with an increase in proof stress, furthermore, in such a fine crystal grain structure, there is a tendency that the fraction of continuous recrystallization in recrystallization increases, the Cu orientation density in the texture increases, and there is also a risk of formability deterioration. In addition, even when the average crystal grain sizes are the same, in a case where the grain size distributions of the crystal grains are nonuniform, local distortion is likely to occur, and the elongation deteriorates. Therefore, when not only is the average crystal grain size set to 6 μm or more and 15 μm or less, but maximum grain size/average grain size≤3.5 is also satisfied, it is possible to obtain a high elongation characteristic. Furthermore, the present inventors also found that, in a case where the crystal grain size exceeds 15 μm, surface roughness during forming becomes significant, and the control of the crystal grain structure is also important for suppressing surface roughening.

The average crystal grain size is preferably 5 μm or more and 10 μm or less, and the ratio is more preferably 2.5 or less. It is possible to obtain a high angle grain boundary map having an orientation difference of 15° or more by a crystal orientation analysis per unit area by electron backscatter diffraction (EBSD).

"With Thickness of Foil being 40 μm, an Elongation in Direction at Each of 0°, 45°, or 90° with Respect to Rolling Direction being 28% or More"

The elongation of the foil is important for high formability, and, in particular, when a direction parallel to the rolling direction is indicated by 0°, it is important that the elongation in a direction at each of 0°, 45°, or 90°, which is the normal direction to the rolling direction, is high. The elongation value of the foil is significantly affected by the thickness of the foil; however, when the elongation is 28% or more at a thickness of 40 μm, high formability can be expected. As a rough standard of elongation in a case where the thickness of the foil is thin, high formability can be expected when the elongation is 12% or more at a thickness of 10 μm, the elongation is 16% or more at a thickness of 20 μm, and the elongation is 22% or more at a thickness of 30 μm. As a rough standard of elongation in a case where the thickness of the foil is thick, high formability can be expected when the elongation is 30% or more at a thickness of 50 μm, the elongation is 32% or more at a thickness of 60 μm, the elongation is 34% or more at a thickness of 70 μm, and the elongation is 36% or more at a thickness of 80 μm.

"Density of Al—Fe-Based Intermetallic Compound Having Grain Size of 1 μm or More and Less than 3 μm: $1 \times 10^4$ Grains/$mm^2$ or More"

A grain size of 1 μm or more is a grain size that is generally said to become a nucleation site during recrystallization, when such an intermetallic compound is highly densely distributed, it becomes easy to obtain fine recrystallized grains during annealing. In a case where the grain size is less than 1 μm or the density is less than $1 \times 10^4$ grains/$mm^2$, it is difficult for the grains to effectively act as nucleation sites during recrystallization, and, when the grain size exceeds 3 μm, pinholes or elongation deterioration during rolling is likely to be caused. Therefore, the density of the Al—Fe-based intermetallic compound having a grain size of 1 μm or more and less than 3 μm is desirably within the above-described range.

"Density of Al—Fe-Based Intermetallic Compound Having Grain Size of 0.1 μm or More and Less than 1 μm: $2 \times 10^5$ Grains/$mm^2$ or More"

The Al—Fe-based intermetallic compound having a grain size of 0.1 μm or more and less than 1 μm is a size that is generally said to be difficult to become a nucleation site during recrystallization, but the present inventors have obtained a result from which the Al—Fe-based intermetallic compound is considered to have a significant influence on the refinement and recrystallization behaviors of the crystal grains.

Although the overall picture of the mechanism is not yet clear, it has been confirmed that not only a coarse intermetallic compounds having a grain size of 1 to 3 μm but also the highly dense presence of a fine compound of less than 1 μm suppress recrystallized grain refinement after the final annealing and a decrease in length of HAGBs/length of LAGBs.

There is also a possibility that the division of the crystal grains (grain subdivision mechanism) during cold rolling may be promoted. Therefore, the density of the Al—Fe-based intermetallic compound having a grain size of 0.1 μm or more and less than 1 μm is desirably the above-described range.

Hereinafter, an example of a manufacturing method of the aluminum alloy foil according to the present embodiment will be described.

An aluminum alloy was prepared to have a composition which contains Fe of 1.0% by mass or more and 1.8% by mass or less, Si of 0.01% by mass or more and 0.10% by mass or less, and Cu of 0.005% by mass or more and 0.05% by mass or less and in which Mn is regulated to 0.01% by mass or less and the remainder includes Al and other inevitable impurities, and an aluminum alloy ingot was manufactured. The manufacturing method of the ingot is not particularly limited and can be performed by an ordinary method such as semi-continuous casting. A homogenization treatment of retaining the obtained ingot at 480° C. to 550° C. for 6 hours or longer is performed.

After the homogenization treatment, hot rolling is performed, and the rolling finishing temperature is set to 230° C. or higher and lower than 280° C. After that, cold rolling is performed, and process annealing is performed in the middle of the cold rolling. In the process annealing, the temperature is set to 300° C. to 400° C. The time of the process annealing is preferably 3 hours or longer and shorter than 10 hours. When the time of the process annealing is shorter than 3 hours, there is a possibility that the material may not soften sufficiently in a case where the annealing temperature is low, and annealing for a long period of time of 10 hours or longer is not economically preferable.

Cold rolling after the process annealing corresponds to final cold rolling, the final cold rolling ratio is 92% or large, and then the final annealing is performed under conditions where the aluminum ingot is held at 250° C. to 350° C. for 10 hours or longer. The thickness of the foil is not particularly limited and can be set to, for example, 10 μm or more and 80 μm or less. Alternatively, the thickness of the foil can also be set to 10 μm or more and 70 μm or less or can be set to 20 μm or more and 70 μm or less.

"Homogenization Treatment: Retained at 480° C. to 550° C. for 6 Hours or Longer"

The homogenization treatment here aims to eliminate micro-segregation in the ingot and to adjust the distribution state of the intermetallic compounds and is an extremely important treatment to obtain a fine and uniform crystal grain structure in the end. In the homogenization treatment, at a temperature of lower than 480° C., micro-segregation in the ingot can be eliminated, but the precipitation of Fe becomes insufficient, the amount of Fe solid solution becomes large, and the density of a coarse intermetallic compound having a grain size of 1 μm or more and less than 3 μm, which acts as a nucleation site for recrystallization, decreases, and thus the crystal grain sizes are likely to become coarse. Therefore, these consequently can become factors that develop surface roughening. In addition, it is effective to perform the homogenization treatment at as low a temperature as possible as long as a fine intermetallic compound having a grain size of 0.1 μm or more and less than 1 μm is highly densely precipitated, and, at higher than 550° C., the density of this fine intermetallic compound decreases. In the homogenization treatment, a heat treatment for a long period of time is required to highly densely precipitate the intermetallic compound, and a minimum of 6 hours or longer needs to be ensured. When the homogenization treatment time is shorter than 6 hours, the precipitation is not sufficient, and the density of the fine intermetallic compound decreases.

"Rolling Finishing Temperature of Hot Rolling: 230° C. or Higher and Lower than 280° C."

Hot rolling is performed after the homogenization treatment. In the hot rolling, it is desirable that the finishing temperature is set to lower than 280° C. and recrystallization is suppressed. When the hot rolling finishing temperature is set to lower than 280° C., a hot-rolled sheet becomes a uniform fiber structure. When recrystallization after the hot rolling is suppressed as described above, the strain amount that is accumulated up to the subsequent process annealing sheet thickness increases, and it is possible to obtain a fine recrystallized grain structure during the process annealing. This leads to the refinement of the final crystal grains and thus contributes to suppression of surface roughening. When the finishing temperature exceeds 280° C., recrystallization occurs in a part of the hot-rolled sheet, the fiber structure and the recrystallized grain structure are present in a mixed manner, and the recrystallized grain sizes during the process annealing become nonuniform, which directly leads to nonuniform final crystal grain sizes. In order to finish the hot-rolled sheet at lower than 230° C., since the temperature during the hot rolling also becomes extremely low, there is a concern that cracks may be generated on the sides of the sheet and the productivity may significantly deteriorate.

"Process Annealing: 300° C. to 400° C."

The process annealing softens the material hardened by the repetition of the cold rolling to recover the rollability and promotes the precipitation of Fe to reduce the amount of solid solution of Fe. When the process annealing temperature is lower than 300° C., there is a risk that the recrystallization may not be completed, the crystal grain structure may become nonuniform and the Cu orientation may significantly develop. In addition, when the process annealing temperature exceeds 400° C., the recrystallized grains are coarsened, and the final crystal grain sizes also increase. Furthermore, at high temperatures, the amount of the precipitate of Fe decreases, and the amount of solid solution of Fe increases. When the amount of Fe solid solution is large, recrystallization during the final annealing is suppressed, and the fraction of low angle grain boundaries increases, which causes a decrease in HAGB/LAGB.

"Final Cold Rolling Ratio: 92% or More"

As the final cold rolling ratio from the process annealing to the final thickness becomes larger, the strain amount that is accumulated in the material becomes larger, the recrystallized grains after the final annealing are further refined. In addition, since the crystal grains are refined even in the process of the cold rolling (grain subdivision), in that sense, the final cold rolling ratio is desirably high, specifically, the final cold rolling ratio is desirably set to 92% or larger. When the final cold rolling ratio is smaller than 92%, a decrease in the accumulated strain amount or crystal grain refinement during rolling also becomes insufficient, the crystal grain sizes after the final annealing increase, and the surface roughening also deteriorates. In addition, in that case, the fraction of recrystallization also increases, LAGBs having an orientation difference of less than 15° increase, and HAGBs/LAGBs becomes small. As for the upper limit, there is no demerit in terms of the characteristics of the material; however, when a thin foil is manufactured by cold rolling exceeding 99.9%, the rollability is degraded, and there is also a concern that breakage due to side cracks may increase.

"Final Annealing: Retained at 250° C. to 350° C. for 10 Hours or Longer"

The final annealing is performed after the final cold rolling, and the foil is completely softened. As the conditions of the final annealing, at a temperature of lower than 250° C. or for a retaining time of shorter than 10 hours, there are cases where softening becomes insufficient, and, when the temperature is set to higher than 350° C., there is a problem of the distortion of the foil, the deterioration of the economic efficiency or the like. The upper limit of the retaining time during the final annealing is preferably shorter than 100 hours from the viewpoint of the economic efficiency.

The aluminum alloy foil obtained by the manufacturing method described above has an excellent elongation characteristic, and, for example, when the thickness is set to 40 μm, the elongation in a direction at each of 0°, 45°, or 90° with respect to the rolling direction becomes 28% or more.

In addition, in the obtained aluminum alloy foil, in the crystal orientation analysis per unit area by electron backscatter diffraction (EBSD), the average grain size of crystal grains surrounded by the high angle grain boundaries, which are grain boundaries having orientation difference of 15° or more, is 6 μm or more and 15 μm or less, maximum grain size/average grain size≤3.5 is satisfied, and the crystal grains have an appropriate size. Therefore, it is possible to suppress the roughening of the surface when distorted.

Furthermore, in the crystal orientation analysis per unit area by electron backscatter diffraction (EBSD), when a grain boundary having an orientation difference of 15° or more is, a grain boundary having an orientation difference of 2° or more and less than 15° is defined as the low angle grain boundary, the length of the high angle grain boundaries is indicated by L1, and the length of the low angle grain boundaries is indicated by L2, L1/L2>2.0 (HAGBs/LAGBs>2.0). Therefore, a higher elongation is realized.

The obtained aluminum alloy foil can be distorted by press forming or the like and can be suitably used as a packaging material for food or lithium ion batteries or the like. The present embodiment does not limit the use of the aluminum alloy foil to the above description, and the aluminum alloy foil can be used in appropriate uses.

EXAMPLES

Ingots of aluminum alloys having a composition shown in Table 1 were produced by a semi-continuous casting method. After that, on the obtained ingots, a homogenization treatment, hot rolling, cold rolling, process annealing, and additional cold rolling were performed under manufacturing conditions shown in Table 1 (conditions for the homogenization treatment, finishing temperatures of the hot rolling, sheet thicknesses through the process annealing, process annealing conditions, and final cold rolling ratios), then, batch-type final annealing was performed at 290° C. for 20 hours, and aluminum alloy foils were manufactured.

The following measurements and evaluations were performed on the obtained aluminum alloy foil.

"Crystal Grain Size"

After the surface of the aluminum alloy foil was electrolytically polished, a crystal orientation analysis was performed by scanning electron microscope (SEM)-EBSD, and crystal grain boundaries having an orientation difference between the crystal grains of 15° or more are specified as HAGBs (high angle grain boundaries), and the sizes of crystal grains surrounded by HAGBs were measured. Three visual fields having a visual field size of 45×90 μm were measured at a magnification of 1000 times, and the average crystal grain size and maximum grain size/average grain size were calculated. Each crystal grain size was calculated as an equivalent circle diameter, and an Area method (average by area fraction method) of EBSD was used in the calculation of the average crystal grain size. OIM Analysis by TSL Solutions was used for the analysis.

"HAGBs/LAGBs"

After the surface of the aluminum alloy foil was electrolytically polished, a crystal orientation analysis was performed by SEM-EBSD, and the high angle grain boundaries (HAGBs) having an orientation difference between the crystal grains of 15° or more and the low angle grain boundaries (LAGBs) having an orientation difference of 2° or more and less than 15° were observed (equipment used: field emission scanning electron microscope (FE-SEM), NVision 40, manufactured by Carl Zeiss AG, EBSD measurement software: OIM Data Collection, manufactured by TSL, EBSD analysis software: OIM Analysis, manufactured by TSL). Three visual fields having a visual field size of 45×90 μm were measured at a magnification of 1000 times, the lengths of HAGBs and LAGBs in the visual fields were obtained, and the ratio was calculated (the ratio of the total values of the three visual fields).

"Crystal Orientation"

The typical orientation of the Cu orientation was set to {112}<111>, and the typical orientation of the R orientation was set to {123}<634>. Each orientation density was evaluated by measuring the incomplete pole figures of {111}, {200}, and {220} in the X-ray diffraction method and calculating a three-dimensional orientation distribution function (ODF) using the results.

"Tensile Strength and Elongation"

Both were measured by a tensile test. The tensile test conformed to JIS Z 2241, a JIS No. 5 test piece was taken from a specimen so that the elongation in a direction at each of 0°, 45°, or 90° with respect to a rolling direction could be measured, and the test was performed with a universal tensile tester (AGS-X 10 kN manufactured by Shimadzu Corporation) at a tensile rate of 2 mm/min.

An elongation rate was calculated as described below. First, before the test, two lines are marked in the vertical direction of the test piece at an interval of 50 mm, which is a gauge length, in the longitudinal center of the test piece. After the test, the broken surfaces of the aluminum alloy foil were matched, the distance between the marks was measured, and the elongation amount (mm) obtained by subtracting the gauge length (50 mm) from the measured distance was divided by the gauge length (50 mm) to obtain the elongation rate.

"Density of Intermetallic Compound"

A parallel cross section (RD-ND surface) of the aluminum alloy foil was cut with a CP (cross section polisher), and an intermetallic compound was observed with a field emission scanning electron microscope (FE-SEM: NVision 40 μmanufactured by Carl Zeiss AG).

Regarding "an Al—Fe-based intermetallic compound having a grain size of 1 μm or more and less than 3 μm", image analysis was performed on 5 visual fields observed at a magnification of 2000 times, and the density was calculated. Regarding "an Al—Fe-based intermetallic compound having a grain size of 0.1 μm or more and less than 1 μm", image analysis was performed on 10 visual fields observed at a magnification of 10000 times, and the density was calculated. Table 1 shows the calculation results.

"Limit Forming Height"

The limit forming height was evaluated by a square tube forming test. The test was performed on the aluminum foil with a universal thin sheet forming tester (manufactured by Erichsen, Inc. model 142/20) using a square punch 1 having a shape shown in FIG. 1 (the length L of one side=37 mm, the chamfer diameter R of a corner part=4.5 mm). As test conditions, the wrinkle suppressing force was 10 kN, the scale of the punch rising rate (forming rate) was set to 1, and mineral oil was applied as a lubricant to one surface (a surface where the punch was about to hit) of the foil. The foil was formed with the punch that rose from the lower portion of the device and hit the foil, and the maximum height that the punch rose when the foil could be formed without cracks or pinholes after being continuously formed three times was specified as the limit forming height (mm) of the material. The height of the punch was changed at intervals of 0.5 mm. Here, in the case of the foil thickness being 40 μm, an overhang height of 11.0 mm or more was regarded as favorable formability and determined as ○, and an overhang height of less than 11.0 mm was determined as x.

Similar to elongation, the forming height is affected by the foil thickness, and the forming height becomes lower as the thickness becomes thinner. Regarding the determination of the limit overhang height in the case of performing the test on a foil having a thin thickness, 7.0 mm or more at a thickness of 10 μm, 9.0 mm or more at a thickness of 20 μm, and 10.5 mm or more at a thickness of 30 μm were regarded as favorable formability and determined as ○, and a value less than the above-described boundary value at each thickness was determined as x. Regarding the determination of the limit overhang height in the case of performing the test on a foil having a thick thickness, 11.5 mm or more at a thickness of 50 μm, 12.0 mm or more at a thickness of 60 μm, 12.5 mm or more at a thickness of 70 μm, and 13.0 mm or more at a thickness of 80 μm or more were regarded as favorable formability and determined as ○, and a value less than the above-described boundary value at each thickness was determined as x.

"Difference ($Ra_{20}-Ra_0$) between initial surface roughness $Ra_0$ and surface roughness $Ra_{20}$ when strain is 20% in tensile test" The surface roughness $Ra_{20}$ at a point in time of distortion of 20% strain in the tensile test was measured using a laser microscope (Keyence Corporation, VK-X100). The measurement site was the center of the width and length of a test piece, measurement was performed on each of the test pieces before the tensile test and the test piece after the distortion of 20% strain, the surface roughness $Ra_0$ before the test and the surface roughness $Ra_{20}$ after the distortion of 20% strain were calculated, and an increase in surface roughness ($Ra_{20}-Ra_0$) was obtained.

TABLE 1

| | | | | | | Manufacturing conditions | | | | | | | |
|---|---|---|---|---|---|---|---|---|---|---|---|---|---|
| | | | | | | Homogenization treatment | | Hot rolling finishing temperature | Process annealing | | | Foil thick-ness | Final cold rolling ratio |
| | | Chemical components (mass %) | | | | Temperature | Time | | Sheet thickness | Temperature | Time | | |
| | No. | Si | Fe | Cu | Mn | (° C.) | (h) | (° C.) | (mm) | (° C.) | (h) | (μm) | (%) |
| Example | 1 | 0.05 | 1.5 | 0.01 | 0.005 | 490 | 8 | 251 | 2.5 | 360 | 4 | 40 | 98.40 |
| | 2 | 0.02 | 1.4 | 0.008 | 0.006 | 510 | 8 | 240 | 2.5 | 400 | 1 | 40 | 98.40 |
| | 3 | 0.07 | 1.6 | 0.01 | 0.003 | 520 | 8 | 265 | 2.5 | 360 | 4 | 40 | 98.40 |
| | 4 | 0.04 | 1.1 | 0.012 | 0.005 | 520 | 10 | 254 | 2.5 | 330 | 4 | 40 | 98.40 |
| | 5 | 0.06 | 1.7 | 0.009 | 0.004 | 520 | 6 | 274 | 2.5 | 360 | 1 | 40 | 98.40 |
| | 6 | 0.04 | 1.4 | 0.007 | 0.008 | 540 | 10 | 255 | 2.5 | 360 | 1 | 40 | 98.40 |
| | 7 | 0.04 | 1.4 | 0.04 | 0.003 | 540 | 8 | 262 | 2.5 | 360 | 4 | 40 | 98.40 |
| | 8 | 0.05 | 1.5 | 0.01 | 0.005 | 490 | 8 | 251 | 2.5 | 360 | 4 | 50 | 98.00 |
| | 9 | 0.05 | 1.5 | 0.01 | 0.005 | 490 | 8 | 251 | 2.5 | 360 | 1 | 70 | 97.20 |
| | 10 | 0.02 | 1.4 | 0.008 | 0.005 | 510 | 8 | 240 | 2.5 | 360 | 4 | 20 | 99.20 |
| | 11 | 0.02 | 1.4 | 0.008 | 0.005 | 510 | 8 | 240 | 2.5 | 360 | 4 | 30 | 98.80 |
| Comparative Example | 12 | 0.13 | 1.3 | 0.01 | 0.004 | 520 | 8 | 240 | 2.5 | 360 | 1 | 40 | 98.40 |
| | 13 | 0.05 | 0.8 | 0.008 | 0.005 | 520 | 8 | 245 | 2.5 | 360 | 4 | 40 | 98.40 |
| | 14 | 0.08 | 1.9 | 0.01 | 0.005 | 520 | 8 | 274 | 2.5 | 330 | 4 | 40 | 98.40 |
| | 15 | 0.06 | 1.5 | 0.001 | 0.003 | 520 | 8 | 250 | 2.5 | 330 | 1 | 40 | 98.40 |
| | 16 | 0.04 | 1.4 | 0.07 | 0.005 | 490 | 8 | 256 | 2.5 | 360 | 4 | 40 | 98.40 |
| | 17 | 0.02 | 1.5 | 0.01 | 0.03 | 520 | 8 | 270 | 2.5 | 360 | 4 | 40 | 98.40 |
| | 18 | 0.05 | 1.4 | 0.01 | 0.006 | 420 | 8 | 248 | 2.5 | 360 | 4 | 40 | 98.40 |
| | 19 | 0.04 | 1.5 | 0.008 | 0.005 | 590 | 8 | 274 | 2.5 | 360 | 4 | 40 | 98.40 |
| | 20 | 0.03 | 1.5 | 0.006 | 0.008 | 520 | 8 | 302 | 2.5 | 330 | 4 | 40 | 98.40 |
| | 21 | 0.06 | 1.5 | 0.01 | 0.004 | 520 | 8 | 268 | 2.5 | 240 | 3 | 40 | 98.40 |
| | 22 | 0.07 | 1.4 | 0.01 | 0.004 | 480 | 8 | 256 | 2.5 | 450 | 3 | 40 | 98.40 |
| | 23 | 0.05 | 1.5 | 0.01 | 0.005 | 520 | 8 | 264 | 0.3 | 330 | 3 | 40 | 86.67 |

TABLE 2

| | | Crystal grain structure | | | | | Intermetallic compound | | Surface roughness | Mechanical properties | | | Limit overhang height |
|---|---|---|---|---|---|---|---|---|---|---|---|---|---|
| | | Average grain size | Grain size ratio | HAGB/ LAGB | Texture | | 1.0 to 3.0 μm | 0.1 to 1.0 μm | | Elongation (%) | | | |
| | No. | (μm) | | | Cu orientation | R orientation | ($\times 10^+$) grains/mm$^2$ | ($\times 10^5$) grains/mm$^2$ | $Ra_{20}-Ra_0$ (μm) | 0° | 45° | 90° | (mm) |
| Example | 1 | 8.5 | 2.9 | 3.1 | 26.4 | 15.6 | 1.9 | 2.3 | 0.17 | 30.5 | 34.2 | 30.0 | 12.5 |
| | 2 | 8.1 | 2.2 | 3.0 | 28.5 | 16.7 | 2.1 | 2.6 | 0.15 | 32.0 | 34.9 | 30.9 | 13.5 |
| | 3 | 9.2 | 3.1 | 3.2 | 25.1 | 14.9 | 1.5 | 2.4 | 0.18 | 29.5 | 33.4 | 29.2 | 12.0 |
| | 4 | 11.4 | 3.2 | 2.7 | 22.3 | 15.5 | 1.2 | 2.1 | 0.22 | 28.5 | 32.1 | 28.6 | 11.5 |
| | 5 | 9.5 | 2.8 | 3.0 | 30.5 | 16.6 | 2.2 | 2.2 | 0.18 | 30.2 | 33.8 | 29.6 | 12.0 |

TABLE 2-continued

| | | Crystal grain structure | | | | | Intermetallic compound | | Surface | Mechanical | | | Limit |
| | | Average grain size (μm) | Grain size ratio | HAGB/ LAGB | Texture | | 1.0 to 3.0 μm (×10⁴) | 0.1 to 1.0 μm (×10⁵) | roughness | properties | | | overhang |
| | No. | | | | Cu orientation | R orientation | grains/mm² | grains/mm² | Ra₂₀-Ra₀ (μm) | Elongation (%) | | | height (mm) |
| | | | | | | | | | | 0° | 45° | 90° | |
|---|---|---|---|---|---|---|---|---|---|---|---|---|---|
| | 6 | 9.8 | 3.2 | 2.5 | 29.4 | 17.0 | 1.8 | 2.3 | 0.18 | 29.2 | 32.6 | 29.3 | 11.5 |
| | 7 | 8.9 | 2.4 | 2.9 | 32.1 | 19.4 | 1.8 | 2.4 | 0.23 | 30.4 | 35.2 | 29.8 | 12.0 |
| | 8 | 9.0 | 3.0 | 3.1 | 26.0 | 15.3 | 1.9 | 2.3 | 0.17 | 32.0 | 35.1 | 31.8 | 13.0 |
| | 9 | 9.7 | 3.2 | 2.9 | 25.3 | 14.6 | 1.9 | 2.3 | 0.19 | 35.4 | 38.6 | 35.3 | 13.5 |
| | 10 | 6.7 | 2.0 | 3.3 | 29.7 | 17.8 | 2.1 | 2.6 | 0.12 | 19.0 | 27.8 | 19.2 | 11.5 |
| | 11 | 7.5 | 2.2 | 3.2 | 29.0 | 17.6 | 2.1 | 2.6 | 0.13 | 23.6 | 31.8 | 23.3 | 13.0 |
| Comparative Example | 12 | 18.4 | 3.1 | 3.6 | 21.7 | 18.3 | 0.8 | 1.4 | 0.34 | 24.0 | 30.4 | 23.5 | 9.0 |
| | 13 | 17.5 | 4.2 | 2.9 | 17.0 | 17.5 | 0.7 | 1.1 | 0.32 | 23.8 | 28.1 | 23.4 | 9.5 |
| | 14 | 7.6 | 2.6 | 2.6 | 32.7 | 25.1 | 2.5 | 2.3 | 0.20 | 26.7 | 33.6 | 24.6 | 8.5 |
| | 15 | 22.7 | 6.4 | 1.7 | 24.3 | 17.4 | 1.9 | 2.2 | 0.47 | 18.6 | 27.1 | 18.5 | 7.5 |
| | 16 | 4.3 | 2.5 | 2.3 | 26.7 | 18.8 | 1.8 | 2.1 | 0.19 | 26.3 | 33.6 | 25.8 | 8.5 |
| | 17 | 3.2 | 2.9 | 1.6 | 42.5 | 29.9 | 1.6 | 2.1 | 0.22 | 24.7 | 34.4 | 23.8 | 9.0 |
| | 18 | 18.8 | 3.2 | 2.4 | 24.8 | 14.9 | 0.6 | 3.1 | 0.28 | 24.9 | 30.8 | 24.1 | 9.0 |
| | 19 | 12.8 | 4.0 | 1.4 | 25.5 | 15.7 | 1.4 | 1.2 | 0.20 | 27.0 | 32.1 | 26.7 | 10.0 |
| | 20 | 14.8 | 4.2 | 2.5 | 24.7 | 15.0 | 1.8 | 2.3 | 0.29 | 24.5 | 29.0 | 24.0 | 8.0 |
| | 21 | 8.8 | 4.5 | 2.1 | 46.9 | 35.4 | 1.7 | 2.2 | 0.23 | 22.9 | 32.1 | 22.4 | 8.5 |
| | 22 | 14.5 | 2.5 | 1.3 | 23.9 | 15.7 | 1.9 | 2.3 | 0.24 | 23.7 | 29.9 | 23.8 | 9.0 |
| | 23 | 16.9 | 3.0 | 1.8 | 22.3 | 14.9 | 1.9 | 2.3 | 0.28 | 24.0 | 30.7 | 23.9 | 8.5 |

As shown in Table 1 and Table 2, in Examples 1 to 11 having a composition which contains Fe of 1.0% by mass or more and 1.8% by mass or less, Si of 0.01% by mass or more and 0.08% by mass or less, and Cu of 0.005% by mass or more and 0.05% by mass or less and in which Mn is regulated to 0.01% by mass or less and the remainder includes Al and inevitable impurities, in which, in the crystal orientation analysis per unit area by electron backscatter diffraction (EBSD), the ratio (HAGBs/LAGBs) of the length of high angle grain boundaries (HAGBs) having an orientation difference of 15° or more to the length of low angle grain boundaries (LAGBs) having an orientation difference of 2° or more and less than 15° is more than 2.0, as the texture, the Cu orientation density is 40 or less, the R orientation density is 30 or less, the difference ($Ra_{20}$–$Ra_0$) between the initial surface roughness $Ra_0$ and the surface roughness $Ra_{20}$ when strain is 20% in the tensile test is 0.25 μm or less, and the foil thickness is 10 to 80 μm, the values of the 0° elongation, the 450 elongation, and the 900 elongation are all excellent, and the balanced elongation is exhibited.

In addition, these examples exhibited excellent limit forming heights.

In contrast to these examples, in Comparative Examples 12 to 17, since any of the Si content, the Fe content, the Cu content, and the Mn content was outside the desirable ranges, any of the average grain size, the grain size ratio, the (HAGBs/LAGBs) value, the Cu orientation or R orientation indicating the texture state, the number of the intermetallic compounds of 1.0 to 3.0 μm or 0.1 to 1.0 μm, and the value of ($Ra_{20}$–$Ra_0$) was outside the desirable ranges, consequently, the elongation in any orientation was insufficient, and the formability deteriorated.

In Comparative Examples 18 and 19, since the homogenization treatment temperatures were lower or higher than the desirable range, the values of ($Ra_{20}$–$Ra_0$) became large or the grain size ratios were large, the values of (HAGBs/LAGBs) became small, and the formability deteriorated in both comparative examples.

In Comparative Example 20, since the hot finishing temperature was high, the grain size ratio was large, the value of (HAGBs/LAGBs) became small, and the formability deteriorated.

In Comparative Examples 21 and 22, since the process annealing temperature was lower or higher than the desirable range, the grain size ratios were large, neither the Cu orientation density nor the R orientation density of the texture satisfied the conditions and thus the texture states were poor, and the values of (HAGBs/LAGBs) became small, and thus the formability deteriorated in both comparative examples.

In Comparative Example 23, since the final cold rolling ratio was less than 92%, the value of (HAGBs/LAGBs) became small, and the value of ($Ra_{20}$–$Ra_0$) became large, and the formability deteriorated.

INDUSTRIAL APPLICABILITY

It is possible to obtain an aluminum alloy foil having a high elongation characteristic.

REFERENCE SIGNS LIST

1: Punch

What is claimed is:

1. An aluminum alloy foil having a composition comprising:
    Fe of 1.0% by mass or more and 1.8% by mass or less;
    Si of 0.01% by mass or more and 0.08% by mass or less;
    Cu of 0.005% by mass or more and 0.05% by miss or less;
    Mn of more than 0% and 0.01% by mass or less; and
    Al,
    wherein, in a crystal orientation analysis per unit area by electron backscatter diffraction (EBSD), a ratio (HAGBs/LAGBs) of a length of high angle grain boundaries (HAGBs) having an orientation difference of 15° or more to a length of low angle grain boundaries (LAGBs) having an orientation difference of 2° or more and less than 15° is more than 2.0, a Cu orientation density is 40 or less and an R orientation density is 30 or less as a texture, a difference ($Ra_{20}-Ra_0$) between an initial surface roughness $Ra_0$ and a surface roughness $Ra_{20}$ when a strain of the aluminum alloy foil is 20% in a tensile test is 0.25 μm or less, and a thickness of the aluminum alloy foil is 10 μm or more and 80 μm or less.

2. The aluminum alloy foil according to claim 1, wherein an elongation in a direction at each of 0°, 45°, or 90° with respect to a rolling direction is 28% or more.

3. The aluminum alloy foil according to claim 2, wherein an average grain size of crystal grains surrounded by high angle grain boundaries having an orientation difference of 15° or more is 6 μm or more and 15 μm or less and maximum grain size/average grain size 3.5 is satisfied.

4. The aluminum alloy foil according to claim 1, wherein an average grin size of crystal grains surrounded by high angle grain boundaries having an orientation difference of 15° or more is 6 μm or more and 15 μm or less and maximum grain size/average grain size≤3.5 is satisfied.

5. The aluminum alloy foil according to claim 1, wherein the composition comprises Si of 0.01% by mass or more and 0.04% by mass or less.

* * * * *